United States Patent [19]
Ohno

[11] Patent Number: 4,506,153
[45] Date of Patent: Mar. 19, 1985

[54] PROCESS SIGNAL COLLECTING APPARATUS

[75] Inventor: Nobuo Ohno, Kobe, Japan

[73] Assignee: Mitsubishi Denki Kabushiki Kaisha, Tokyo, Japan

[21] Appl. No.: 370,243

[22] Filed: Apr. 20, 1982

[30] Foreign Application Priority Data

Apr. 29, 1981 [JP] Japan ................. 56-66083

[51] Int. Cl.³ .......................................... G02B 5/14
[52] U.S. Cl. ...................... 250/227; 250/226; 455/606
[58] Field of Search .............. 250/227, 231 R, 231 P, 250/226; 455/605, 606, 607, 610, 612; 350/96.15, 96.16

[56] References Cited

U.S. PATENT DOCUMENTS

| | | | |
|---|---|---|---|
| 4,186,380 | 1/1980 | Edwin et al. | 455/612 |
| 4,356,395 | 10/1982 | Miller | 250/227 |
| 4,356,396 | 10/1982 | Ruell et al. | 250/227 |

OTHER PUBLICATIONS

"Numa Logic 700 Series Programmable Controllers", Mar. 19, 1979, *Westinghouse Electric Corporation*, Madison Heights, Michigan.

*Primary Examiner*—David C. Nelms
*Attorney, Agent, or Firm*—Lowe King Price & Becker

[57] ABSTRACT

A process signal collecting apparatus comprises light transmitters (24, 25) for transmitting light pulses of the first and second wavelengths. These light pulses are transmitted through an optical fiber path (19) and light branches (401 to 416) to on/off optical switches (701 to 716). Each of the on/off optical switches is structured such that the light pulses of the first and second wavelengths are reflected therefrom when the same is in an on state while only the light pulse of the second wavelength is reflected when the same is in an off state. The reflected light pulses are detected by first and second light receivers (26, 27). A timing pulse is generated responsive to the reflected light pulse of the second wavelength. The presence or absence of the reflected light pulse of the first wavelength is discriminated as a function of the timing pulse, whereby an on state or an off state of each of the on/off optical switches is determined. The data of the decision thus obtained is stored in a memory (13) and is utilized by a central processing unit (1).

8 Claims, 18 Drawing Figures (A)

(B)

(A) ADDRESS (B) READY (C) INPUT DATA (D) REPLY

PROCESS SIGNAL COLLECTING APPARATUS

BACKGROUND OF THE INVENTION

1. Field of the Invention

The present invention relates to a process signal collecting apparatus. More specifically, the present invention relates to a novel process signal collecting apparatus for collecting two-value signals obtainable from two-value optical switches such as switches, setting means and the like provided for the purpose of process control in a plant such as of rolling mills in steel manufacture.

2. Description of the Prior Art

A process control system is employed in various plants such as a steel manufacturing plant for the purpose of process control of rolling mills. As is well known, a process control is adapted to control an operation of a plant system such as rolling mills in accordance with a sequential process as a function of the data of various data sources such as an open/close state of contents of various switches, setting means and the like. To that end, a process control system comprises a process signal collecting apparatus for determining a two-value state or a binary state of various devices, such as an open/close state of each contact of various switches, setting means and the like.

FIGS. 1 and 2 are block diagrams of conventional process signal collecting apparatuses. First referring to FIG. 1, an outline of a conventional process signal collecting apparatus will be described. The process signal collecting apparatus shown comprises a central processing unit 1, an input controller 2, and a level converting circuit 3. A plurality of contacts 41 to 4n are connected to the level converting circuit 3. These contacts 41 to 4n may comprise switches or setting means provided in rolling mills in a steel manufacturing plant. The level converting circuit 3 is adapted to convert relatively high control voltages being applied to the contacts 41 to 4n to a voltage level as low as 5 V which is suited for processing by the central processing unit 1. The two-value signals such as on/off signals of the respective switches 41 to 4n, as level converted by the level converting circuit 3, are applied to the input controller 2. The central processing unit 1 is adapted to supply an access signal for collecting the on/off signals to the input controller 2 and is also adapted to perform other processing. The input controller 2 is responsive to the access signal from the central processing unit 1 to provide the respective on/off signals from the contacts 41 to 4n in succession to the central processing unit 1. The central processing unit 1 is responsive to the on/off signals obtained from the contacts 41 to 4n to execute an operation for further process control.

Considering the case of rolling mills, for example, the apparatus could extend as long as 1 km and a rolling mill of such length comprises several hundred switches, setting means and the like distributed throughout the length. On the other hand, a process signal collecting apparatus is usually installed at a location spaced apart remotely from such rolling mills and connection of these several hundreds of switches and setting means to the above described level converting circuit 3 necessitates cables 5 of an increased length. Accordingly, the cost of installation of such cables is considerably increased. Since a number of cables 5 are coupled to the level converting circuit 3 in a concentrated manner, additional installation of new switches for connection of cables to the level converting circuit 3 makes such connection work extremely difficult.

Accordingly, an approach is considered in which several hundred switches are divided into a plurality of groups so that a local station may be provided in each of the groups, whereby switches as grouped are connected to each local station and the on/off signals collected by each local station are transmitted to the central processing unit 1 through a signal transmission cable. Such data collecting apparatus is shown in FIG. 2. Referring to FIG. 2, a plurality of local stations 6 are provided. Each local station 6 comprises a transmission control circuit 61, an input controller 62, and a level converting circuit 63. The level converting circuit 63 is connected to contacts 401 to 40n of a plurality of switches, setting means or the like, as grouped. The level converting circuit 63 is adapted to convert the levels of the on/off signals obtained from the contacts 401 to 40n. The input controller 62 receives in succession the on/off signals as level converted by the level converting circuit 63 and provides the same to the transmission control circuit 61. The transmission control circuit 61 serves to transmit the on/off signals in succession on a transmission cable 10.

The central processing unit 1 is coupled to an input controller 2, a buffer memory 7, an output controller 8, and a transmission control circuit 9. The buffer memory 7 comprises storing regions for storing the respective on/off signals of the contacts 401 to 40n connected to each of the local stations 6. The transmission cable 10 is connected to the transmission control circuit 9. The transmission control circuit 9 receives in succession the on/off signals obtained from the local stations 6 and provides the same to the output controller 8. The output controller 8 is responsive to the on/off signals, thereby to designate in succession the addresses of the buffer memory 7. When the buffer memory 7 is addressed, the respective on/off signals are stored in the corresponding storing regions of the contacts 401 to 40n. The central processing unit 1 is loaded in succession with the on/off signals obtained from the buffer memory 7 through the input controller 2. Thus the on/off signals from the respective local stations 6 are stared in succession in the buffer memory. The central processing unit 1 performs further process control based on the on/off signals obtained from the respective contacts 401 to 40n as stored in the buffer memory 7.

By disposing a plurality of local stations 6 distributed in conjunction with rolling mills, for example, it is possible to shorten the distances between the respective contacts 401 to 40n and the local stations 6. In addition, since a number of cables are connected to the respective local stations 6 in a scattered manner, any work required for addition of new switches can be achieved with relative simplicity.

Meanwhile, the above described local stations 6 each have a predetermined number of contacts which are connectable and hence it is largest efficient to connect the largest possible number of contacts within such predetermined number. Therefore, if and when the number of contacts being connected to a given local station exceeds the number of lines connectable to the local station, those contacts of the excessive number of contacts need be connected to another local station having a spare number of connections, which necessitates a complicated consideration of the local stations with those number of contacts. Since those excessive number of contacts are usually connected to a local station less remotely located, this accordingly necessitates an elongated length of cables connected to these contacts. Accordingly, when the respective contacts are connected to the local stations 6, both the number of contacts being connectable to the respective local stations 6 and the length of each cable need be taken into consideration in determining connection, which necessitates excessive labor and time in designing the whole system.

In addition, a number of noise sources such as motors, electromagnetic valves and the like are usually provided in the vicinity of rolling mills, which are liable to generate continuously electric surges. If and when such electric surges are transferred on the transmission cable 10, it is liable that erroneous on/off signals are stored in the buffer memory 7, which could be a cause of malfunction of the central processing unit 1 in a process control.

SUMMARY OF THE INVENTION

The present invention determines whether a plurality of two-value optical switches are each in a first state or a second state by utilization of a light pulse transmitted through a light transmission path. More specifically, a light pulse is transmitted from a light transmitter through a light transmission path and through a plurality of light transmission branches to a plurality of corresponding two-value optical switches. The respective two-value optical switches are each structured such that a light pulse is reflected when the switch is in a first state and the reflection state of the light pulse is differentiated, or made different, in a second state of the switch. The differentiation of or difference in the reflection state of the light pulse is detected by a light receiver provided to receive the reflected light pulse through the light transmission branches and the light transmission path from the respective two-value optical switches. The total length of the light transmission from the light transmitter through the light transmission path and the corresponding one of the light transmission branches to each of the two-value optical switches and through the said light transmission branch and the light transmission path to the light receiver is selected to be different for each of the two-value optical switch, so that each of the two-value optical switches may be uniquely identified by the corresponding total length. Identification of each of the two-value optical switch is based on the time difference corresponding to the total length between the transmission time when the light pulse is transmitted and the reception time when the reflected light pulse is received and decision is also made of whether each of the two-value optical switches thus identified is in a first state or a second state in response to the outputs from the light receiver. The data concerning the decisions is stored in storage means. Process control means is provided for performing a process control based on the data concerning the decisions stored in the storage means.

According to the present invention, mere installation of a light transmission path coupled through light transmission branches to a plurality of corresponding two-value optical switches implements a process signal collecting apparatus. Thus, the present invention eliminates the necessity of connecting with conventional cables a number of two-value optical switches to a station in parallel, as done in a conventional approach. By installing the respective light transmission branches in the vicinity of the plurality of corresponding two-value optical switches and by installing the light transmission path so as to be coupled through the respective light transmission branches to the respective two-value optical switches, it is possible to shorten the total length of the light transmission path as compared with the total length of the conventional cables. Additional installation of new two-value optical switches can be done by connecting new light transmission branches to the light transmission path and by coupling new two-value optical switches to the end of the light transmission path. Accordingly, in additionally installing two-value optical switches, the necessity of installing conventional cables in consideration of the number of two-value optical switches and the length of cables, as required in a conventional approach, is eliminated whereby excessive labor and waste of time can be reduced. In addition, transmission of the signal by way of a light pulse in accordance with the present invention eliminates a possibility of malfunction due to external electrical surges.

In a preferred embodiment of the present invention, the light transmission branches are interposed in the light transmission path at predetermined intervals, whereby the light transmission path is sectioned into a plurality of sections, each having the same length so that the light pulse reflected at each two-value optical switch may be received by the light receiver with a predetermined time difference. The two-value optical switches are each structured such that the light pulse may be reflected only when the two-value optical switch is in an on state. A timing pulse is generated so that the pulse intervals may be associated with the time difference between the respective reflected light pulses and the presence or absence of the reflected light pulses being received by the receiver is determined as a function of the timing pulse, whereby it is determined with ease whether each of the two-value optical switches is in a first state or in a second stage. Each time the presence or absence of the reflected light pulse is determined, the information is stored in the register and, each time determination of the presence or absence of the sixteen reflected light pulses is completed, the storage means is addressed, while the write enable signal is supplied to the storage means, whereby the data representing the first or second state of each of the two-value optical switches is stored. In such a case, it is necessary to avoid a read operation from the process control means during a period of time when the write enable signal is applied to the storage means. However, such period of time is too short as compared with the full period of operation to interfere with the control operation of the process control means. Accordingly, by simply supplying the address signal from the process control means to the storage means, the process control means can read the data representing the first or second state of each of two-value optical switches stored in the storage means.

In another preferred embodiment of the present invention, the light pulses of first and second wavelengths are transmitted from the light transmitters to the two-value optical switches. Each of the two-value optical switches is structured such that the light pulse of the first and second wavelengths may be reflected when the switch is in a first state and the light pulse of the second wavelength may be reflected when the switch is in a second state. The light receiver comprises first and second photodetectors for detecting the reflected light pulses of the first and second wavelengths, respectively.

A timing pulse is generated in response to the output from the second photodetector. Alternatively, a timing pulse may be generated by adapting each of the two-value optical switches such that the light pulse of the first wavelength may be reflected when the switch is in a first state and the light pulse of the second wavelength may be reflected when the switch is in a second state and by detecting the outputs from both the first and second photodetectors. Decision can be made of whether each of the two-value optical switches is in the first state or the second state by detecting the output from the first photodetector as a function of the thus generated timing pulse.

Thus, according to the embodiment, generation of a timing pulse in response to the reflected light pulse of the second wavelength or the reflected light pulses of the first and second wavelengths reflected from the two-value optical switches eliminates the necessity of making equal to intervals between the two adjacent reflected light pulses of the first wavelength representing the first state of each of the two-value optical switches. More specifically, the embodiment in discussion is free from a restriction that the length of the each of light transmission path sections interposed between the respective two-value optical switches need be equal to each other, as required in the previously described embodiment. The light transmission path sections for connecting the two adjacent two-value optical switches may be selected to be short enough to allow discrimination of the above described time difference between the two adjacent reflected light pulses. Accordingly, the total length of the light transmission path, typically an optical fiber of a relatively expensive cost, can be shortened and the total cost of the whole system can also be reduced.

Accordingly, a principal object of the present invention is to provide a process signal collecting apparatus that makes it possible to couple a plurality of two-value optical switches with ease without regard to the number of the two-value optical switches.

An aspect of the present invention resides in a process signal collecting apparatus adapted for avoiding a possibility of malfunction caused by external electric surges.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
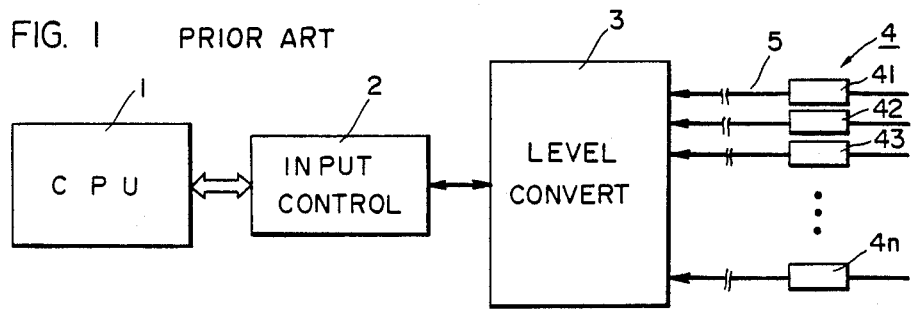
FIGS. 1 and 2 are block diagrams of conventional process signal collecting apparatuses.
Figure 2:
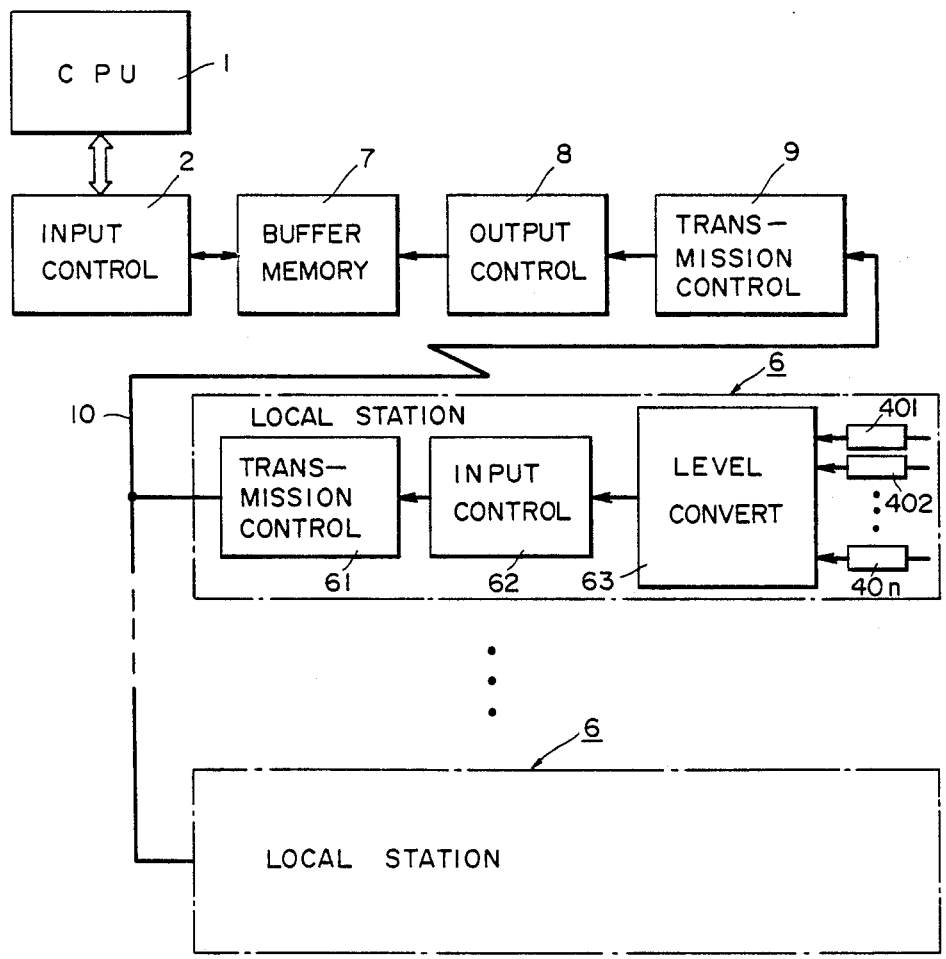
Figure 3:
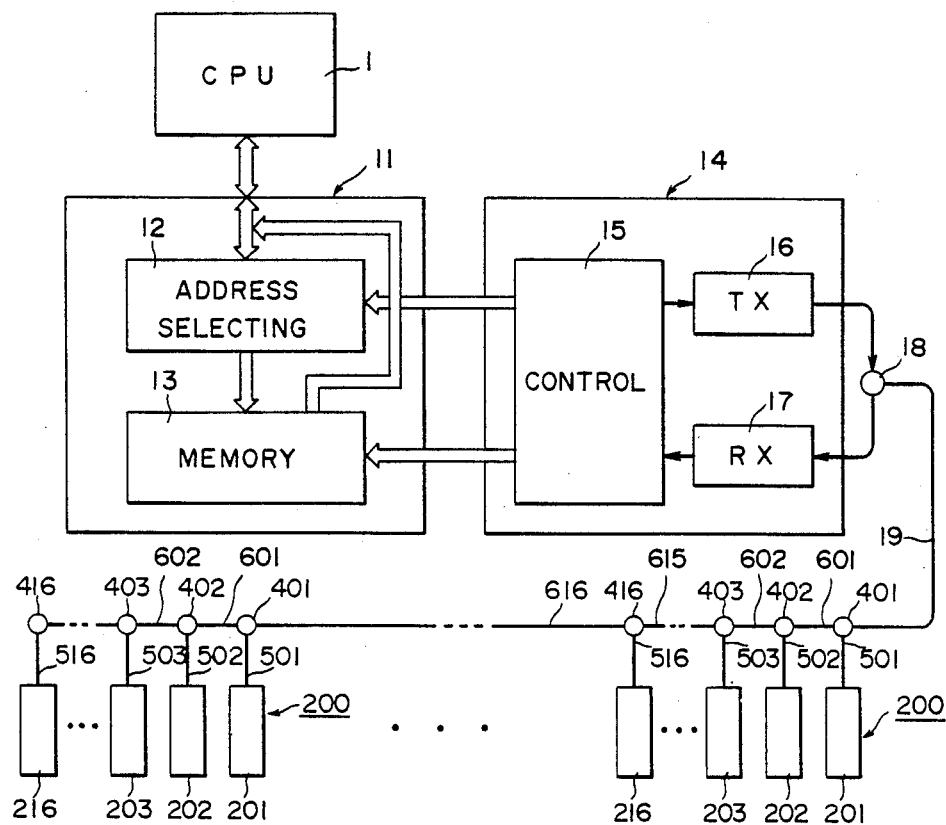
FIG. 3 is a block diagram of one embodiment of the present invention.

FIG. 3 is a block diagram of one embodiment of the present invention. First referring to FIG. 3, a process signal collecting circuit in accordance with the present invention comprises a central processing unit 1, a memory control circuit 11, an input/output circuit 14, a light distributor 18, an optical fiber 19, and sixteen, for example, on/off optical switch groups 200. Each on/off optical switch group 200 comprises sixteen on/off optical switches 201 to 216, light branches 401 to 416, optical fiber sections 501 to 516 each selected to be of the same length, and optical fiber sections 601 to 615 each selected to be of the same length.

More specfically, the central processing unit 1 is adapted to collect on/off signals obtained from the on/off optical switches 201 to 216, thereby to perform a process control of a system such as rolling mills. The memory control circuit 11 comprises an address selecting circuit 12 and a memory 13. The address selecting circuit 12 is adapted to select the address signal obtained from the central processing unit 1 or the address signal obtained from the input/output circuit 14 so that the selected one may be applied to the memory 13. The memory 13 comprises storing regions of say 16 bits × 16 for storing on/off signals of the on/off optical switches 201 to 216 included in the sixteen on/off optical switch groups 200. Meanwhile, the storing regions of say 16 bits × 16 are required in collecting the on/off signal from the 256 on/off optical switches. In the case of a system adapted for collecting the on/off signals from the 512 on/off optical switches, the storing regions of 16 bits × 32 would be required.

The input/output circuit 14 comprises an input/output control circuit 15, a light transmitter 16 and a light receiver 17. The input/output control circuit 15 is adapted to transmit a light pulse from the light transmitter 16 and to receive a signal obtained from the light receiver 17 in response to a reflected light pulse, thereby to provide an address signal of the memory 13 and on/off signals from the on/off optical switches 201 to 216 as the data to the memory 13. The light transmitter 16 may comprise a light emitting diode, a semiconductor laser or the like. The light receiver 17 may comprise an avalanche photodiode or the like. The light transmitter 16 and the light receiver 17 are coupled to the light distributor 18. The light distributor 18 is adapted to transfer a light pulse from the light transmitter 16 to the optical fiber path 19 and the light pulse obtained from the optical fiber path 19 to the light receiver 17. The light distributor 18 will be described in detail subsequently with reference to FIGS. 5A and 5B. The light distributor 18 is connected through the optical fiber path 19 to the light branch 401 included in the on/off optical switch group 200 of the first stage. The light branch 401 is disposed in the vicinity of the on/off optical switch 201 such as a switch disposed in a rolling mill, for example. The light branch 401 is connected through the optical fiber lead 501 to the on/off optical switch 201. The light branches 402 to 416 are in succession connected in series through the optical fiber sections 601 to 615 to the light branch 401. The light branch 416 is connected through the optical fiber section 616 to the light branch 401 included in the on/off optical switch group 200 of the next stage. The on/off optical switch 202 to 216 are individually connected through the optical fiber leads 502 to 516 to the respective light branches 402 to 416. As will be described in detail subsequently in conjunction with FIG. 4, the on/off optical switches 201 to 216 are adapted to reflect the light pulse transmitted from the light transmitter 16 if and when the respective signals are in the on state and not to reflect the light pulse when the respective signals are in the off state.

The optical fiber sections 601 to 615 are each selected to be of the same length so that the respective time differences after the light pulse is emitted from the light transmitter 16 until the same is reflected at the respective on/off optical switches 201 to 216 and entered in succession to the light receiver 17 may be constant, such as t. The above described time differences are selected to be of a time length which is identifiable of the respective reflected light pulses and are typically selected to be several μsec, for example. The lengths of the respective optical fiber sections 601 to 615 are selected to be of approximately several m for the purpose of providing the above described time differences. Accordingly, if and when the on/off optical switches 201 to 216 are to be disposed in a concentrated manner, it could happen that the optical fiber sections 601 to 615 become undesirably long. Therefore, for the purpose of adaptation to such undesirable length, optical fiber sections of such surplus length are interposed as an optical fiber coil, for example. The length of the optical fiber section 616 connecting the respective on/off optical switch groups 200 is selected to be four times the length of the optical fiber section 601. The purpose is to select the time after the reflected light pulse from the on/off optical switch group 200 of the first stage is supplied to the light receiver 17 until the reflected light pulse from the on/off optical switch group 200 of the next stage is supplied to the light receiver 17 to be such a delay time that the on/off optical signals of the on/off optical switch group 200 of the first stage stored in the register 155 may be loaded to the memory 13 during the above described delay time.

Now an operation of the process signal collecting apparatus will be briefly described. First the input/output control circuit 15 functions to cause the light transmitter 16 to transmit one light pulse. The light pulse is then transmitted through the light distributor 18 to the optical fiber path 19. The light pulse transmitted through the optical fiber path 19 is first branched by the light branch 401 and the light pulse as branched is supplied through the optical fiber lead 501 to the on/off optical switch 201. The light pulse that has passed through the light branch 401 is transmitted through the optical fiber section 601 to the light branch 402. The light pulse is again branched by the light branch 402 and the light pulse as branched is supplied through the optical fiber lead 502 to the on/off optical switch 202. Then it follows that the light pulse supplied to the on/off optical switch 202 is delayed by a time period t corresponding to the double length of the optical fiber section 601 as compared with the light pulse supplied to the above described on/off optical switch 202. Likewise, the light pulse is in succession branched by the light branches 403 to 416 and is supplied to the on/off optical switches 203 to 216. If and when the signal of the on/off optical switch 201 has been in the on state, the light pulse is reflected therefrom and the reflected light pulse is fed through the optical fiber lead 501, the light branch 401 and the optical fiber path 19 to the light distributor 18. The light distributor 18 transfers the reflected light pulse to the light receiver 17. The light receiver 17 converts the reflected light pulse into an electrical signal, which is then supplied to the input/output control circuit 15. The input/output control circuit 15 is responsive to the electrical signal from the light receiver 17 to determine that the on/off optical switch 201 has been in the on state, thereby to provide an on signal representative of the logic one value to the register 155. At that time the address selecting circuit 12 has been turned to the central processing unit 1, so that the central processing unit 1 can freely access the memory 13.

If and when the contact of the on/off optical switch 201 has been in the on state, after a delay of the time period t corresponding to the double length of the optical fiber section 602 as compared with the light pulse reflected from the on/off optical switch 201, the light pulse reflected from the on/off optical switch 202 is supplied to the light receiver 17. If and when the signal of the on/off optical switch 202 has not been in the on state, no light pulse is supplied to the light receiver 17 even after a delay of the time period t as compared with the light pulse reflected from the on/off optical switch 201. The input/output control circuit 15 determines that the on/off optical switches 202 to 216 each have been in the on state if and when the same has determined that the light receiver 17 has received the reflected light pulse the time period t after the light pulse is transmitted from the light transmitter 16 and the light receiver 17 receives the light pulse at every time period t and determines that any corresponding one of the on/off optical switches has been in the off state if no reflected light pulse is received after a given time period. The on/off signals thus determined are stored in the respective storing register 155. When the on/off signals of the respective on/off signal switches 201 to 216 are stored in the register 155, the address selecting circuit 12 is then turned to the input/output circuit 14. The content in the register 155 is stored in a predetermined address of the memory 13. The central processing unit 1 is placed in a standby state in which the on signal or the off signal stored in the memory 13 is prevented from being read, during only a period of time when the address selecting circuit 12 selects the address signal from the input/output circuit 14 whereby the content in the register 155 is stored in the memory 13.

Figure 4:
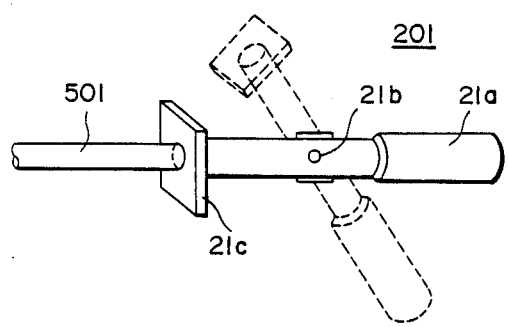
FIG. 4 is a perspective view showing one example of an on/off optical switch shown in FIG. 3.

FIG. 4 is a perspective view showing one example of the on/off optical switch 201 shown in FIG. 3. Referring to FIG. 4, the on/off optical switch 201 comprises a handle 21a structured such that the same may be rotated about a fulcrum 21b. A mirror 21c is provided at the end of the handle 21a. The mirror 21c is adapted such that when the signal is in the on state the same comes in contact with the end surface of the optical fiber lead 501 so that the light pulse transmitted through the optical fiber lead 501 may be reflected and when the signal is in the off state the handle 21a is rotated to the position shown by the dotted line in FIG. 4 whereby the mirror 21c is moved away from the end surface of the optical fiber lead 501.

Figure 5A:
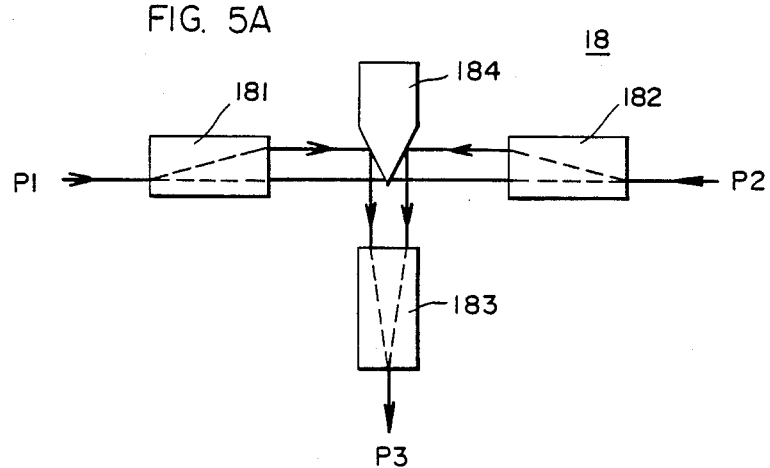
FIGS. 5A and 5B are views showing one example of a light distributor shown in FIG. 3.
Figure 5B:
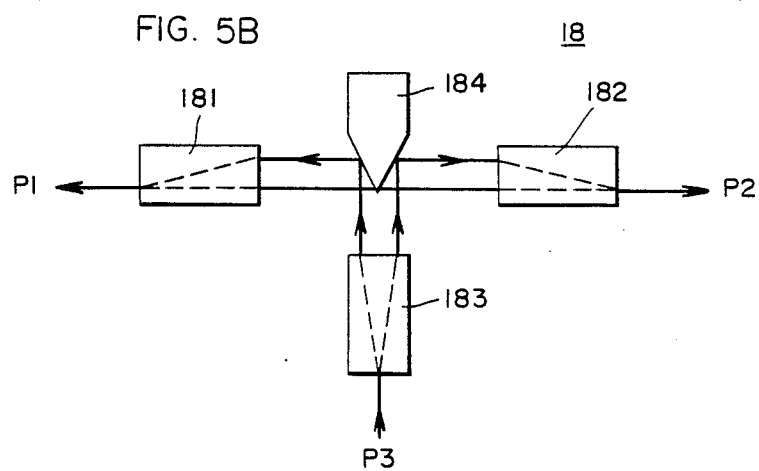

FIGS. 5A and 5B are views showing one example of the optical distributor 18 shown in FIG. 3. Referring to FIGS. 5A and 5B, the light distributor 18 will be described. The light distributor 18 comprises rod lenses 181 to 183 and a mirror 184. The light distributor 18 functions such that when the light beam is supplied as shown as P1 and P2 the light beam is transferred through the rod lenses 181 and 182 and is reflected from the mirror 184 and the reflected light beam is obtained through the rod lens 183 as P3. Conversely, the light distributor 18 functions such that, as shown in FIG. 5B, the incoming light beam shown as P3 passes through the rod lens 183 and is reflected from the mirror 184 in the exact opposite directions. One light beam as reflected is obtained as P1 through the rod lens 181 and the other light beam as reflected is obtained as P2 through the rod lens 182. Accordingly, by connecting the light transmitter 16 shown in FIG. 3 to the light path portion P1, by connecting the light receiver 17 to the light path portion P2 and by connecting one end of the optical fiber path 19 to the light path portion P3, the light pulse emitted from the light transmitter 16 is transferred through the rod lens 181 and is reflected by the mirror 184 and is transferred back through the rod lens 183 to the optical fiber path 19. Conversely, the reflected light pulse from the on/off optical switch 201 transferred through the optical fiber path 19 is fed from the light path P3 to the rod lens 183 and is reflected from the mirror 184 and is transferred through the rod lens 182 to the light receiver 17.

Figure 6:
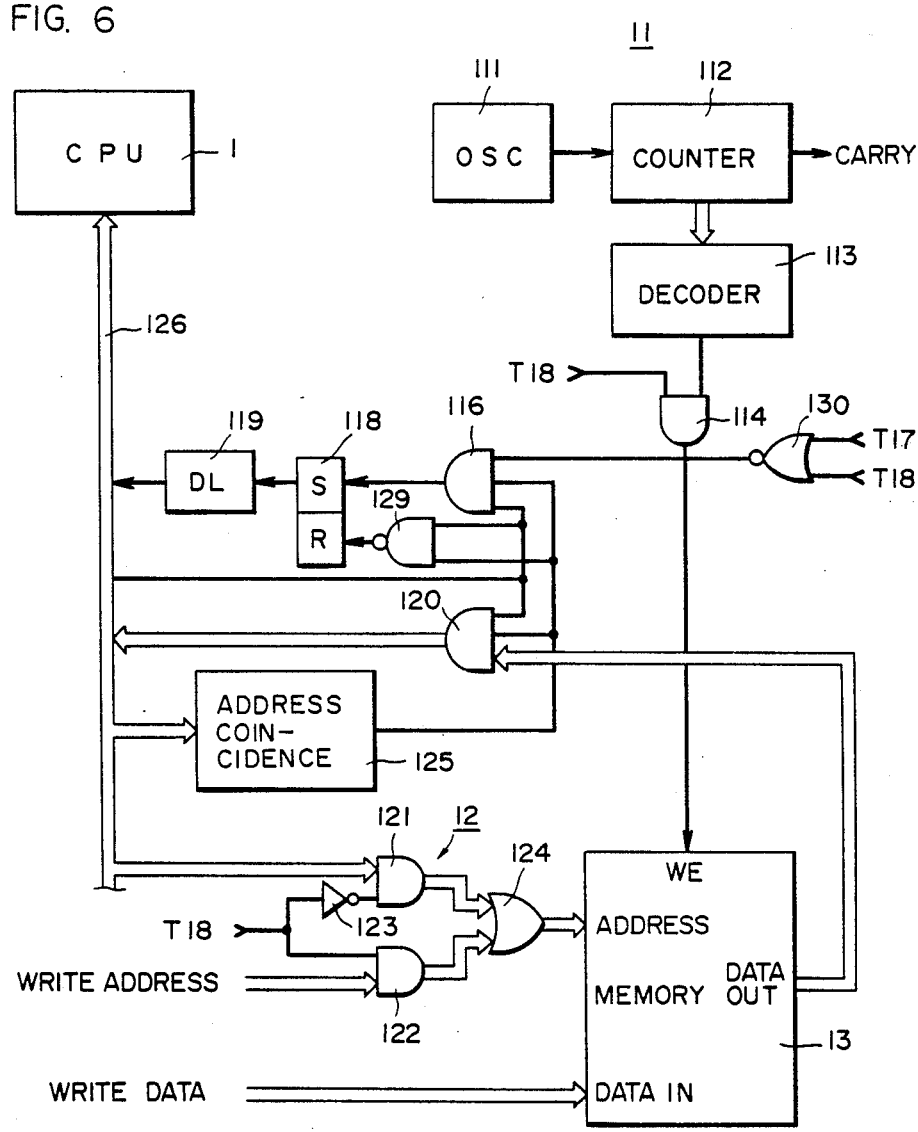
FIG. 6 is a block diagram showing in more detail a central processing unit and memory shown in FIG. 3.
Figure 7:
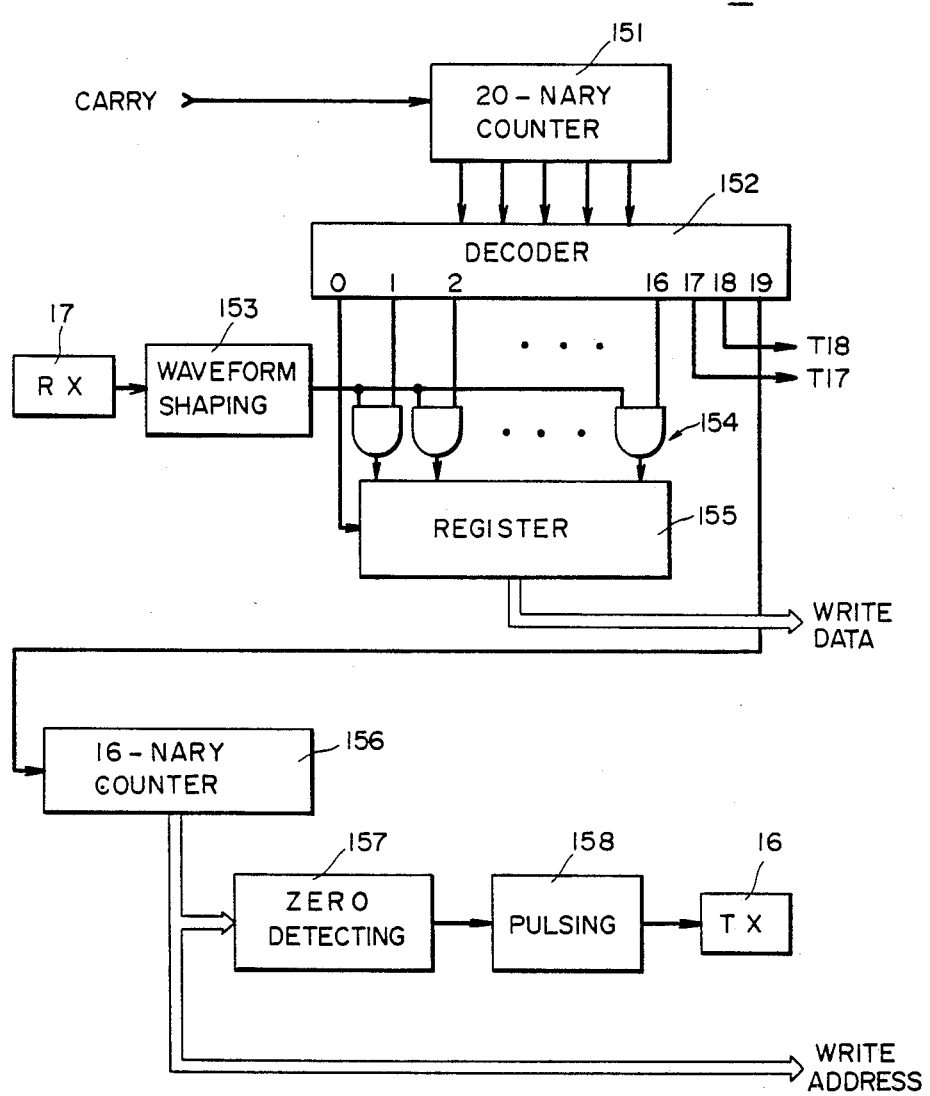
FIG. 7 is a block diagram showing in more detail an input/output circuit shown in FIG. 3.

FIG. 6 is a block diagram showing in greater detail the central processing unit 1 and the memory control circuit 11 shown in FIG. 3, and FIG. 7 is a block diagram of the input/output control circuit 13 shown in FIG. 3.

Now referring to FIGS. 6 and 7, the structure of the memory control circuit 11 and the input/output control circuit 15 will be specifically described. As shown in FIG. 6, the memory control circuit 11 basically comprises an address selecting circuit 12, a memory 13, an oscillator 111, a 16-nary counter 112, a decoder 113, and an address coincidence detecting circuit 125. As shown in FIG. 7, the input/output control circuit 15 basically comprises a 20-nary counter 151, a decoder 152, a waveform shaping circuit 153, a register 155, a 16-nary counter 156, a zero detecting circuit 157, and a pulsing circuit 158.

More specifically, the oscillator 111 is provided to generate a timing pulse. The pulse interval of the timing pulse is selected to correspond to 1/16 of the time difference t by which each light pulse is delayed when the light pulse is transmitted through the optical fiber sections 601 to 615 connected between the light branches 401 to 416 shown in FIG. 3. Although it was assumed in the foregoing that the pulse interval of the timing pulses is 1/16 of the time difference t, this should not be construed by way of a limitation inasmuch as the same may be modified such that the pulse interval of the timing pulses may be selected so that the intermediate point of the time difference t may also be designated. The timing pulse is supplied to the 16-nary counter 112. The counter 112 counts the timing pulse to provide a carry signal to the 20-nary counter 151 each time sixteen timing pulses are counted by the 16-nary counter 112.

The 20-nary counter 151 counts the carry signal to identify each of the on/off optical switches 201 to 216. To that end, the count-up signals from the 20-nary counter 151 are supplied to the decoder 152. The decoder 152 decodes the count value by the 20-nary counter 151 to provide the decode signals T0 to T19. The decoded signal T19 is supplied to the 16-nary counter 156. The 16-nary counter 156 is provided to identify each of the sixteen on/off optical switch groups 200 in succession. To that end, the count output signal from the 16-nary counter 156 is supplied to the address selecting circuit 12 shown in FIG. 6 as a write address signal. Although the 16-nary counter 156 is employed so that as many on/off optical switches as 256 may be utilized in the foregoing embodiment, a 32-nary counter should be utilized in the case where as many as 512 on/off optical switches are installed, a 64-nary counter should be utilized in the case where as many as 1024 on/off optical switches are installed, and so on.

The count output signal from the 16-nary counter 156 is also supplied to the zero detecting circuit 157. The zero detecting circuit 157 is provided to detect that the count output signal by the 16-nary counter 156 has reached zero, thereby to provide the zero detected signal of the high level. The zero detected signal from the zero detecting circuit 157 is supplied to the pulsing circuit 158. The pulsing circuit 158 is provided to pulse the zero detected signal remaining the high level for a relatively long period obtained from the zero detecting circuit 157 by differentiating the zero detected signal. The pulse signal from the pulsing circuit 158 is supplied to the light transmitter 16. Accordingly, the light transmitter 16 transmits a light pulse after the sixteen on/off optical switch 201 to 216 are identified in succession. The decoded signal T0 from the decoder 152 is supplied to the register 155 as a reset signal. The decoded signals T1 to T16 are each supplied to one input of each of sixteen AND gates 154.

On the other hand, the light receiver 17 converts the light pulse reflected from the on/off optical switches 201 to 216 into an electrical signal and the electrical signal thus obtained is supplied to the waveform shaping circuit 153 as an on signal. The waveform shaping circuit 153 shapes the waveform of the electrical signal and the waveform shaped output is supplied to the other input of each of the above described AND gates 154. Accordingly, each of the AND gates 154 provides an on/off signal representative of an on/off state of each of the on/off optical switches 201 to 216 depending on whether the reflected pulse is obtained from each of the sixteen on/off optical switches 201 to 216, whereby each on/off signal is stored in the register 155. The on/off signal as stored in the register 155 is supplied to the memory 13 shown in FIG. 6 as write data.

Referring again to FIG. 6, the count output signal from the above described 16-nary counter 112 is decoded by the decoder 113 and one of the decoded signals is supplied to one input of the AND gate 114. The other input of the AND gate 114 is connected to receive the decoded signal T18 obtained from the decoder 152 shown in FIG. 7. Accordingly, the AND gate 114 provides a write enable signal WE to the memory 13 when the on/off signals from the sixteen on/off optical switches 201 to 216 are stored in the register 155.

The address selecting circuit 12 comprises AND gates 121 and 122 and an inverter 123 and on OR gate 124. The decoded signal T18 from the decoder 152 shown in FIG. 7 is supplied to one input of the AND gate 122 as an address selecting signal and is inverted by the inverter 123 and the inverted output is supplied to one input of the AND gate 121. The other input of the AND gate 121 is connected to receive the address signal obtained from the central processing unit 1. The other input of the AND gate 122 is connected to receive the write address signal obtained from the 16-nary counter 156 shown in FIG. 7. Accordingly, when the on/off signals as stored in the register 155 are to be stored in the memory 13, the decoded signal T18 has become the high level, which makes the AND gate 122 be enabled and the AND gate 121 be disabled. Therefore, the AND gate 122 provides the address signal from the 16-nary counter 156, which is supplied through the OR gate 124 to the memory 13. The on/off signals as stored in the register 155 are stored in the memory 13 as a function of the write enable signal obtained from the AND gate 114.

When the decoded signal T18 is obtained thereafter from the decoder 152, the AND gate 121 is enabled and the AND gate 122 is disabled. As a result, the AND gate 121 provides the address signal from the central processing unit 1, which is supplied through the OR gate 124 to the memory 13. The address signal obtained from the central processing unit 1 is also applied to the address coincidence detecting circuit 125. The address coincidence detecting circuit 125 serves to determine whether the address signal obtained from the central processing unit 1 coincides with the address signal predetermined for enabling the process signal collecting apparatus. If and when the address coincidence detecting circuit 125 determines that both signals coincide with each other, the same provides the coincidence detected output of the high level to the AND gates 116 and 120 at one input thereof. At that time a high level ready signal has been obtained from the central processing unit 1, which is applied to the one input of each of the AND gates 116 and 120. The AND gate 120 is also connected to receive the data from the memory 13. Accordingly, the AND gate 120 is responsive to the high level address coincidence detected signal and the high level ready signal to provide the data of the memory 13 to the bus line 126.

On the other hand, a NOR gate 130 is connected to receive the decoded signals T17 and T18 shown in FIG. 7. An AND gate is connected to receive the signal from the NOR gate 130. As a result, the AND gate 116 is responsive to the decoded signals T17 and T18 to be disabled, thereby to provide the high level signal to the set input of the flip-flop 118. A NAND gate 129 is connected to receive the address coincidence detected signal and the ready signal. The output signal of the NAND gate 129 is supplied to the reset input of the flip-flop 118. As a result, the flip-flop 118 is set and the high level output is supplied to the delay circuit 119. The delay circuit 119 is provided to secure a delay time period after the ready signal is obtained until the data serves to the bus line. The delay circuit 119 serves to provide the set signal of the flip-flop 118 to the bus line 126 as a reply signal. The central processing unit 1 receives the data obtained from the AND gate 120 when the reply signal is obtained after the ready signal is obtained.

Figure 8:
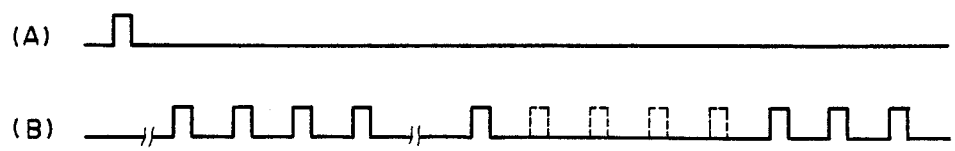
FIGS. 8 and 9 are graphs showing waveforms for explaining an operation of the embodiment shown in FIGS. 6 and 7.
Figure 9:
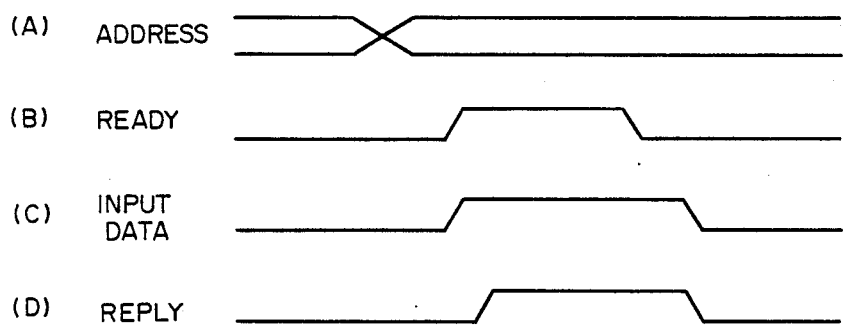

FIGS. 8 and 9 are graphs showing waveforms for explaining an operation of one embodiment of the present invention. Now referring to FIGS. 3 to 9, an operation of one embodiment of the present invention will be specifically described. It is assumed that in an initial condition all the counters have been cleared. Therefore, the zero detecting circuit 157 shown in FIG. 7 determines that the counter output by the 16-nary counter 156 has reached zero, thereby to provide the zero detected signal of the high level. The pulsing circuit 158 converts the zero detected signal in a pulse form and the pulse output is supplied to the light transmitter 16. The light transmitter 16 is responsive to the pulse signal to provide a light pulse as shown as (A) in FIG. 8. The light pulse is transferred along the optical fiber path 19 through the light distributor 18 shown in FIG. 3. The light pulse transmitted through the optical fiber path 19 is branched by the light branch 401 and the branched light beam is fed through the optical fiber lead 501 to the on/off optical switch 201. The remaining light pulse at the light branch 401 is transmitted through the optical fiber section 601 to the next adjacent light branch 402. Again the light pulse is branched by the light branch 402 and is fed through the optical fiber lead 502 to the second on/off optical switch 202. Likewise the light pulse is branched by the light branches 403 to 416 and is fed to the on/off optical switch 203 to 216, respectively.

Assuming that the signal of the first on/off optical switches 201 has been in the off state, the mirror 21c has been received from the end surface of the optical fiber lead 501 and no light pulse emitted from the optical fiber lead 501 is reflected therefrom. However, in the case where the signal of the on/off optical switch 201 has been in the on state, the mirror 21c has been brought in contact with the end surface of the optical fiber lead 501 and the light pulse is reflected therefrom. The reflected light pulse is fed through the optical fiber lead 501, the light branch 401, the optical fiber path 19 and the light distributor 18 to the light receiver 17. If and when the signal of the second on/off optical switch 202 has been in the on state, the reflected light pulse from the second on/off optical switch 202 is received by the light receiver 17 the time period t after the reflected light pulse from the first on/off optical switch 201 is received by the light receiver 17. Similarly, if and when the signal of the third on/off optical switch 203 has been in the on state, the reflected light pulse is received by the light receiver 17 after the lapse of the time period 2t. Accordingly, if and when the on/off optical switches 201 to 216 have been in an on state, the reflected light pulses obtained in a pulse train, as shown as (B) in FIG. 8, are received by the light receiver 17.

The light receiver 17 serves to convert the respective reflected light pulses into an electrical signal, which is applied to the waveform shaping circuit 153 shown in FIG. 7. The waveform shaping circuit 153 shapes the waveform of the electrical signal, which output is then applied to the respective AND gates 154. At that time the 20-nary counter 151 has been counting the carry signal at each time period t. The count output signal from the 20-nary counter 151 is decoded by the decoder 152. The decoded signal T0 obtained from the decoder 152 serves to reset the register 155. The decoded signals T1 to T16 then obtained from the decoder 152 are effective to enable the respective AND gates 154. Accordingly, the respective AND gates 154 provide an on signal of the logic one or an off signal of the logic zero corresponding to the on/off state of the on/off optical switches 201 to 216. These on/off signals are stored in the register 155 and are immediately fed to the memory 13.

On the other hand, the 16-nary counter 156 has become the count value of zero at that time point. Since the decoded signal T18 has been obtained from the decoder 152 at that time, the address selecting circuit 12 shown in FIG. 6 has been turned to the input/output control circuit 15. Therefore, as shown as (A) in FIG. 9, the memory 13 is controlled so that the storing regions of the address zero may be designated by the count output signal of the 16-nary counter 156. Then the on signal of the logic one or the off signal of the logic zero obtained from each of the on/off optical switches 201 to 216 included in the on/off optical switch group 200 of the first stage is stored in the above described storing regions.

The AND gate 116 is enabled if and when the decoded signals T17 and T18 are not obtained from the decoder 152, the ready signal shown as (B) in FIG. 9 is obtained from the central processing unit 1 and the coincidence detected signal of the high level is obtained from the address coincidence detecting circuit 125. The flip-flop 118 is responsive to the high level signal obtained from the AND gate 116 to be set and the high level output signal obtained from the flip-flop 118 is delayed for a predetermined time period by means of the delay circuit 119. The signal as thus delayed is fed through the bus line 126 to the central processing unit 1 as a reply signal as shown as (D) in FIG. 9. The purpose of providing the flip-flop 18 is to provide to the central processing unit 1 the data of the memory 13 and the reply signal even when the decode signal T17 is received in the case where the ready signal is obtained at the timing of the end of the decode signal T16. In such a case, the delay time of the delay circuit 119 should be selected to be shorter than the pulse width of the decode signal T17. The central processing unit 1 is responsive to the reply signal to be ready for loading of the data obtained from the memory 13. On the other hand, if and when the decoded signal T18 is obtained following the decoded signal T17 from the decoder 152, the address selecting circuit 12 is turned to select the address signal obtained from the central processing unit 1. At that time the address signal for designating the storing region number zero of the memory 13 is obtained from the central processing unit 1. The on signal of the logic one or the off signal of the logic zero of the on/off optical switch group 200 of the first stage is fed from the memory 13 through the AND gate 120 to the central processing unit 1 as a function of the above described signal.

When the decoded signal T19 is then obtained from the decoder 152, the 16-nary counter 156 performs a count operation accordingly. Therefore, the 16-nary counter 156 designates the next address of the memory 13. Since the decoded signal T18 has not been obtained at that time, the address selecting circuit 12 has been turned to the input/output control circuit 15. When the decoded signal T0 is obtained again from the decoder 152, the register 155 is reset. When the decoded signals T1 to T16 are obtained from the decoder 152, the AND gate 154 serves to store in the register 155 the on signal or the off signal depending on whether the signal based on the reflected light pulse from the on/off optical switch group 200 of the next stage is received or not. The on signal or the off signal stored in the register 155 is stored in the memory 13 and is fed to the central processing unit 1 in the same manner as described previously.

As described in the foregoing, according to the embodiment described a light pulse is transmitted through the optical fiber path 19 and the optical fiber sections 601 to 615 and is reflected only if and when the contact of each of the on/off optical switches 201 to 216 has been closed, whereby it is readily determined whether any of the on/off optical switches have been closed based on the time differences after the light pulse is transmitted until the reflected light pulse is returned from each of the on/off optical switches. If and when additional on/off optical switches are to be newly provided, new light branches are interposed between midway between optical fiber sections and on/off optical switches are simply coupled through optical fiber leads to the light branches. Thus, additional installation work can be done with extreme simplicity. Transmission of a signal by way of a light beam provides immunity from an electrical surge interference, thereby to evade possible malfunction which was liable to occur in accordance with the conventional approach.

Meanwhile, if and when an interval between adjacent on/off optical switches 203 and 204 becomes unavoidably larger than the intervals of any other adjacent on/off optical switches, the lengths of the respective optical fiber sections 601 to 615 may be selected to be consistent with the intervals between the on/off optical switches 203 and 204. Alternatively, only the length of the optical fiber section 603 coupled between the on/off optical switches 203 and 204 may be selected to be an integer multiple, say double, the length of any other optical fiber sections such as 601. In such a case, it follows that passage of the light pulse through the optical fiber section 603 requires a time period as long as twice the time required for the passage of the light pulse through any other optical fiber sections. However, it is recalled that the register 155 has been adapted such that the on or off signal is loaded at every time period t as a function of the timing pulse. Therefore, it follows that the on signal based on the reflected light pulse which passed through the optical fiber section 603 is loaded in the next adjacent storing region by skipping one-bit storing region of the register 155. In order to make the electrical circuit adaptable to such an optical fiber network, therefore, the register 155 may be structured to be of 17 bits, so that the above described skipped bit region may be a vacant bit.

It is recalled that the embodiment shown in FIGS. 3 to 9 was adapted such that the length of each of the optical fiber sections 601 to 615 for connecting the respective light branches was selected to be the same and the length of each of the optical fiber leads 501 to 516 for connecting the respective on/off optical switches 201 to 216 was also selected to be the same, so that the time difference of the respective light pulses reflected from the on/off, optical switches 201 to 216 may be the same. The approach employed in the embodiment shown in FIGS. 3 to 9, however, involves an inconvenience that the length of the optical fiber sections to be added need be selected to be the same as that of the optical fiber sections 601 to 615.

Figure 10:
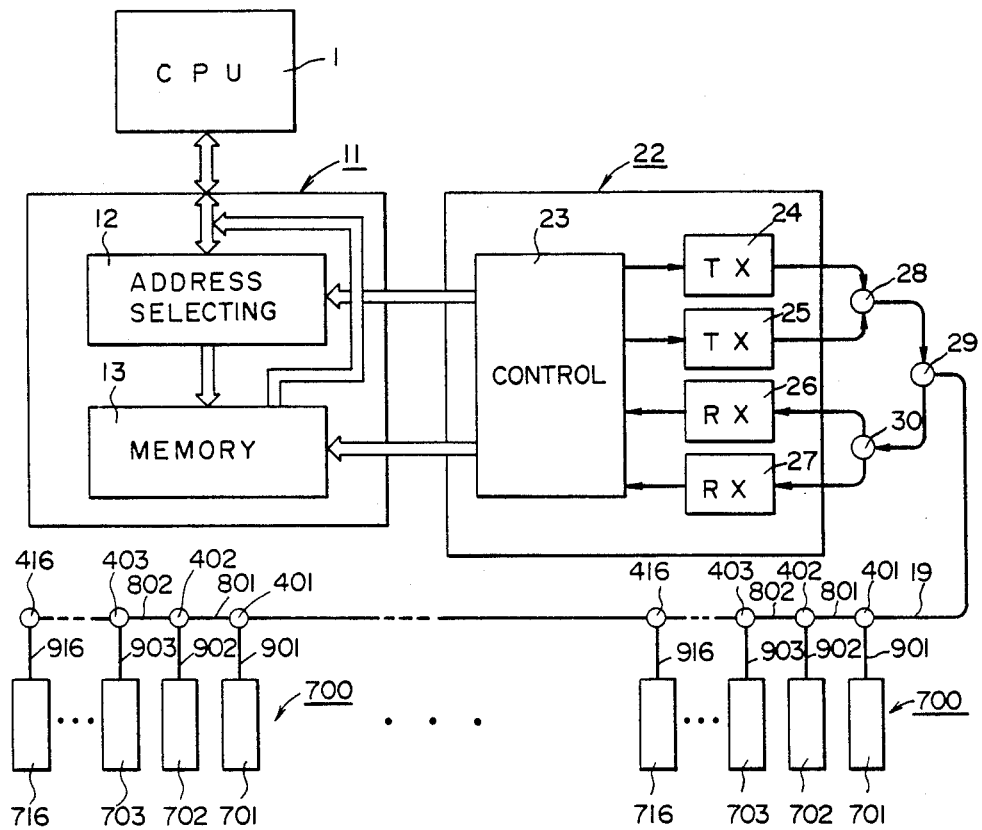
FIG. 10 is a block diagram showing another embodiment of the present invention.

FIG. 10 is a block diagram of another embodiment of the present invention adapted for eliminating the above described inconvenience. More specifically, the FIG. 10 embodiment is adapted such that the reflected light pulses from any of the on/off optical sources can be identified with ease even in the case where the lengths of change each optical fiber section for connecting the respective on/off optical switches 201 to 216 are different. To that end, the input/output circuit 22 comprises an input/output control circuit 23, a first light transmitter 24 for transmitting a light beam of wavelength λ1, a second light transmitter 25 for transmitting a light beam of wavelength λ2, a first light receiver 26 for receiving a reflected light pulse of the wavelength λ1, and a second light receiver 27 for receiving a reflected light pulse of the wavelength λ2. The light transmitters 24 and 25 are adapted to emit light beams of the wavelengths λ1 and λ2, respectively, and may each comprise a light emitting diode or a laser diode. The light receivers 26 and 27 each comprise an avalanche photodiode and a filter for filtering the reflected light pulse of the wavelength λ1 or λ2 to the avalanche photodiode. The light pulse of the wavelength λ1 and the light pulse of the wavelength λ2 emitted from the light transmitters 24 and 25 are composed by a light composer 28 and the composed light pulse is transmitted through a light distributor 29 to an optical fiber path 19. The light pulse transmitted through the optical fiber path 19 is branched by means of light branches 401 to 416 included in an on/off signal source group 700 of the first stage and the branched light pulses are fed to the respective on/off optical switches 701 to 716. The on/off optical switches 701 to 716 are each structured such that when the signal of each is in the off state the light pulse of the wavelength λ1 is not reflected and when the signal of each is in the on state the light pulse of the wavelength λ1 is reflected while the light pulse of the wavelength λ2 is usually reflected irrespective of whether the signal of each of the on/off optical switches 701 to 716 has been in the off state or on state. Accordingly, assuming that the signal of the on/off signal source 701 has been in the off state, only the light pulse of the wavelength λ2 is reflected, whereas assuming that the signal of the same has been in the on state both the light pulses of the wavelengths λ1 and λ2 are reflected. The reflected light pulses are fed through the optical fiber lead 901, the light branch 401, the optical fiber path 19 and the light distributor 29 to the light separator 30. The light separator 30 aims to separate the reflected light pulse of the wavelength λ1 and the reflected light pulse of the wavelength λ2, so that the reflected light pulse of the wavelength λ1 may be fed to the light receiver 26 and the reflected light pulse of the wavelength λ2 may be fed to the light receiver 27. The light receivers 26 and 27 convert the respective reflected light pulses into electrical signals, which are then applied to the input/output control circuit 23. The input/output control circuit 23 is responsive to the electrical signals based on the reflected light pulses obtained from the light receivers 26 and 27, thereby to determine whether any of the on/off optical switches 701 to 716 are of an on state or an off state. More specifically, the input/output control circuit 23 is supplied with the reflected light pulse of the wavelength λ2 from the light receiver 27 as a timing pulse irrespective of whether any of the on/off signal sources 701 to 716 are of an on state or an off state. The input/output control circuit 23 is further supplied from the light receiver 26 with the reflected light pulse of the wavelength λ1 reflected from any of the on/off optical switches which are in an on state. Accordingly, the input/output control circuit 23 can determine with ease whether any of the on/off optical switches 701 to 716 are in an on state or an off state, by determining the state of the signals from the light receiver 26 at the timing when the timing pulse is obtained. The determination thus obtained is fed from the input/output control circuit 23 to the memory control circuit 11. The address signal is fed from the input/output control circuit 23 to the memory control circuit 11. The memory control circuit 11 may be of substantially the same structure as that shown in FIG. 3.

Figure 11:
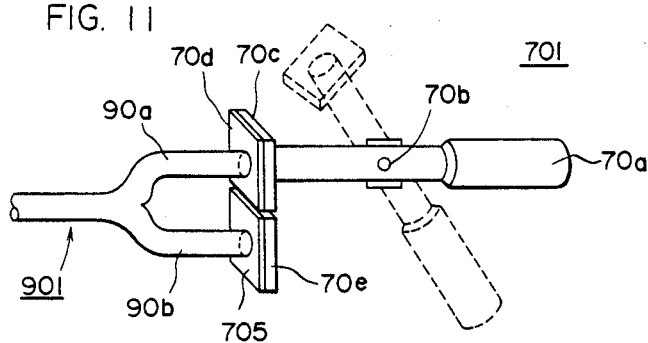
FIG. 11 is a perspective view showing one example of an on/off optical switch shown in FIG. 10.

FIG. 11 is a perspective view showing one example of the on/off optical switch 701 shown in FIG. 10. Referring to FIG. 11, the on/off optical switch 701 employed in the embodiment will be described in more detail. The on/off optical switch 701 comprises a handle 70a provided to be rotatable about a fulcrum 70b, and a mirror 70c provided at the end of the handle 70a, as is similar to the structure of the on/off optical switch 201 shown in FIG. 4, and further comprises a filter 70d provided to the mirror 70c. The characteristic of the filter 70d is selected such that only the light pulse of the wavelength λ1 transmitted from the optical fiber section 901 may transmit therethrough.

On the other hand, the tip end of the optical fiber section 901 comprises two branch fingers 90a and 90b extending in parallel. Such branch fingers 90a and 90b may be structured by cutting an optical fiber to a short length, by working and polishing the same, and by combining two of the same. The end surface of one branch finger 90a is disposed so that the filter 70d may face when the signal, not shown, of the on/off optical switch 701 is in the on state and the end surface of the other branch finger 90b is disposed so that the filter 70f and the mirror 70e may be fixed thereto. The characteristic of the filter 70f is selected so that only the light pulse of the wavelength λ2 may transmit therethrough. Accordingly, the light pulse of the wavelength λ2 transmitted from the optical fiber section 901 is always reflected from the mirror 70e after passing through the filter 70f irrespective of whether the on/off optical switch 701 is in an on state or an off state. With such structure of the on/off optical switch 701, the handle 70a is turned to the position shown by the dotted line in FIG. 11 when the signal is in the off state, so that only the light pulse of the wavelength λ2 transmitted from the optical fiber section 901 may transmit through the filter 70f and may be reflected from the mirror 70e, while the light pulse of the wavelength λ1 does not transmit through the filter 70f and hence is not reflected from the mirror 70e. When the signal is in the on state, the filter 70d of the handle 70a comes to face the end surface of the branch 90a and therefore the light pulse of the wavelength λ1 transmits through the filter 70d and is reflected from the mirror 70c.

Figure 12A:
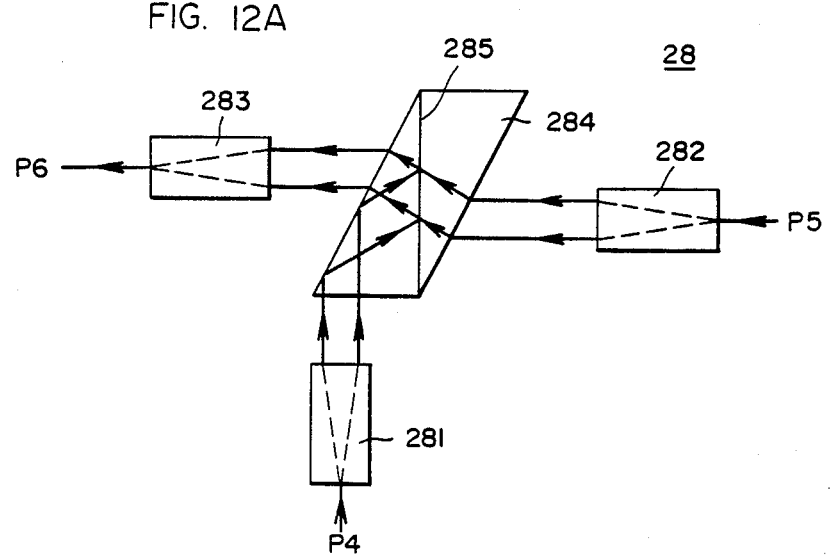
FIG. 12A is a view showing one example of a light composer shown in FIG. 10.
Figure 12B:
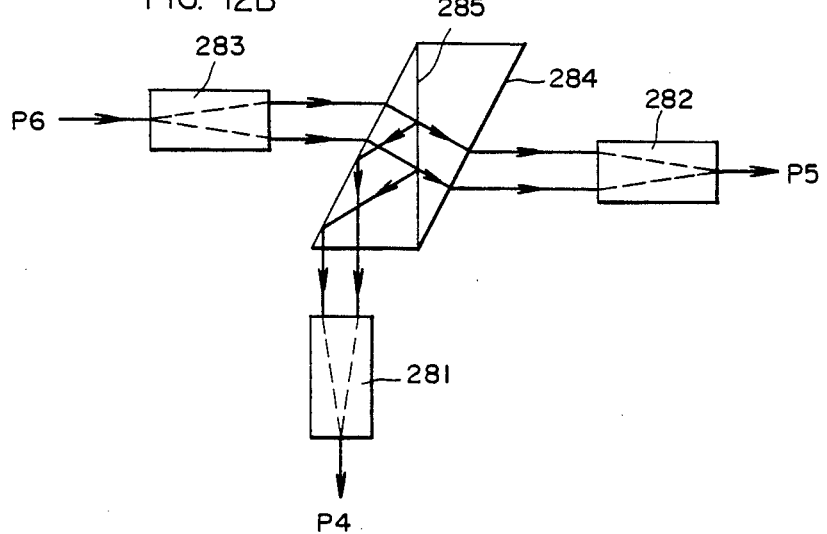
FIG. 12B is a view showing an example of a light composer used as a light distributor.

FIG. 12A is a view showing one example of the light composer 28 shown in FIG. 10, and FIG. 12B is a view showing an example of employing the light composer 28 as the light separator 30.

First referring to FIG. 12A, the light composer 28 will be described. The light composer 28 comprises rod lenses 281 to 283, a prism 284 and an interference film filter 285. The interference film filter 285 is adapted such that the light pulse of the wavelength λ1 may be reflected while the light pulse of the wavelength λ2 may transmit. Accordingly, when the light pulse of the wavelength λ1 is caused to enter as P4 the light pulse may transmit through the rod lens 281 and the prism 284 and may be reflected from the interference film filter 285. The reflected light pulse is then obtained through the rod lens 283 as P6. On the other hand, if and when the light pulse of the wavelength λ2 is caused to enter as P5, the light pulse is guided through the rod lens 282 to the prism 284. Then the light pulse transmits through the interference film filter 285 and is withdrawn through the rod lens 283 as P6. Accordingly, by connecting the light transmitter 24 shown in FIG. 10 to the portion P4 and by connecting the light transmitter 25 to the portion P5, the two light pulses of the wavelengths $\lambda1$ and $\lambda2$ emitted from the light transmitters 24 and 25 can be composed by the light composer 28.

Meanwhile, the light composer 28 shown in FIG. 12A may also be utilized as the light separator 30. More specifically, as shown in FIG. 12B, the light pulse as composed of the wavelengths $\lambda1$ and $\lambda2$ is caused to enter as P6. Then the composed light pulse is caused to enter through the rod lens 283 to the prism 284. Then only the light pulse of the wavelength $\lambda1$ out of the composed light pulse is reflected from the interference film filter 284 and the reflected light pulse is obtained through the rod lens 281 as P4. On the other hand, the light pulse of the wavelength $\lambda2$ transmits through the interference film filter 284 without being reflected from the interference film filter 284, so that the same is withdrawn through the rod lens 282 as P5. Accordingly, by connecting the light distributor 29 shown in FIG. 10 to the portion P6, by connecting the light receiver 26 to the portion P4 and by connecting the light receiver 27 to the portion P5, of the composed light pulse of the wavelengths $\lambda1$ and $\lambda2$ obtained from the light distributor 29 the light pulse of the wavelength $\lambda1$ may be caused to enter the light receiver 26 and the light pulse of the wavelength $\lambda2$ may be caused to enter the light receiver 27.

Figure 13:
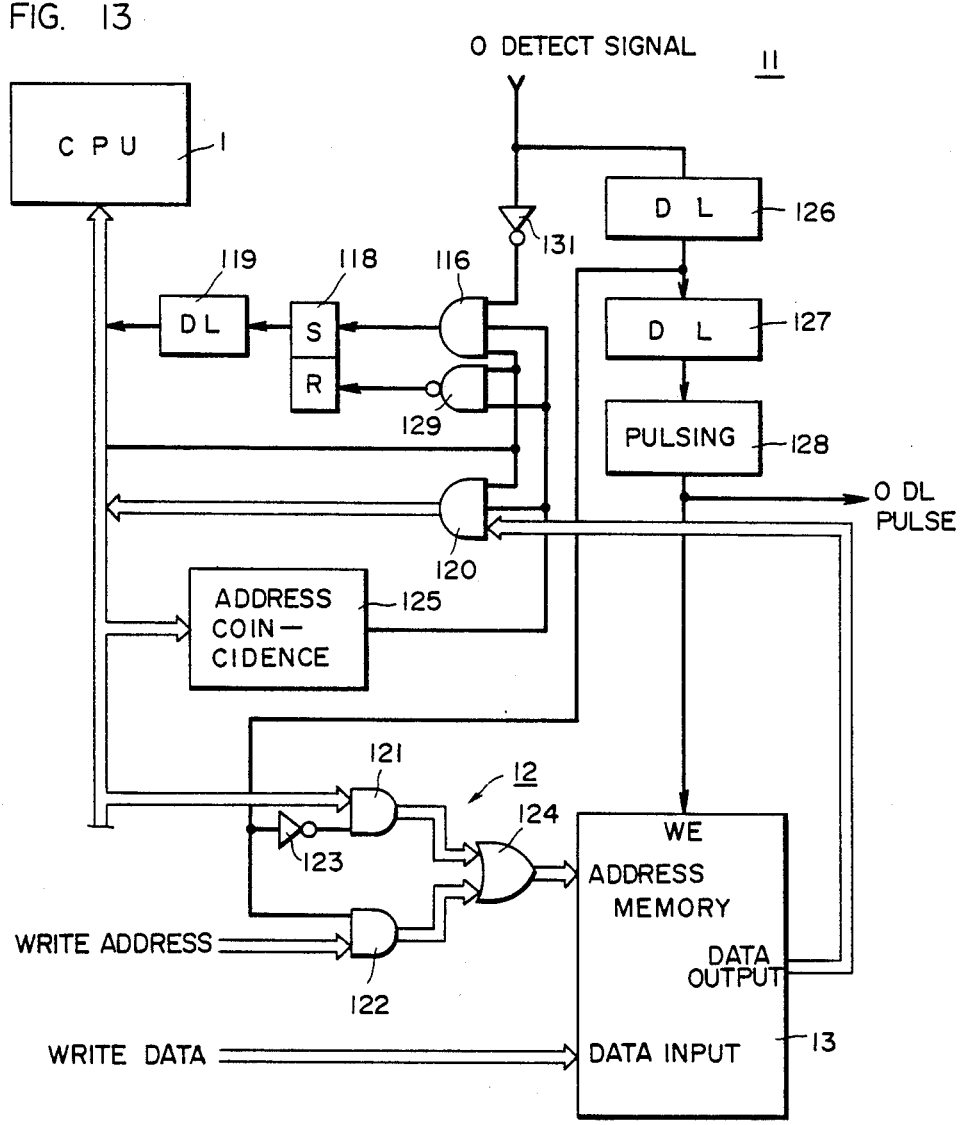
FIG. 13 is a block diagram of a memory control circuit shown in FIG. 10.
Figure 14:
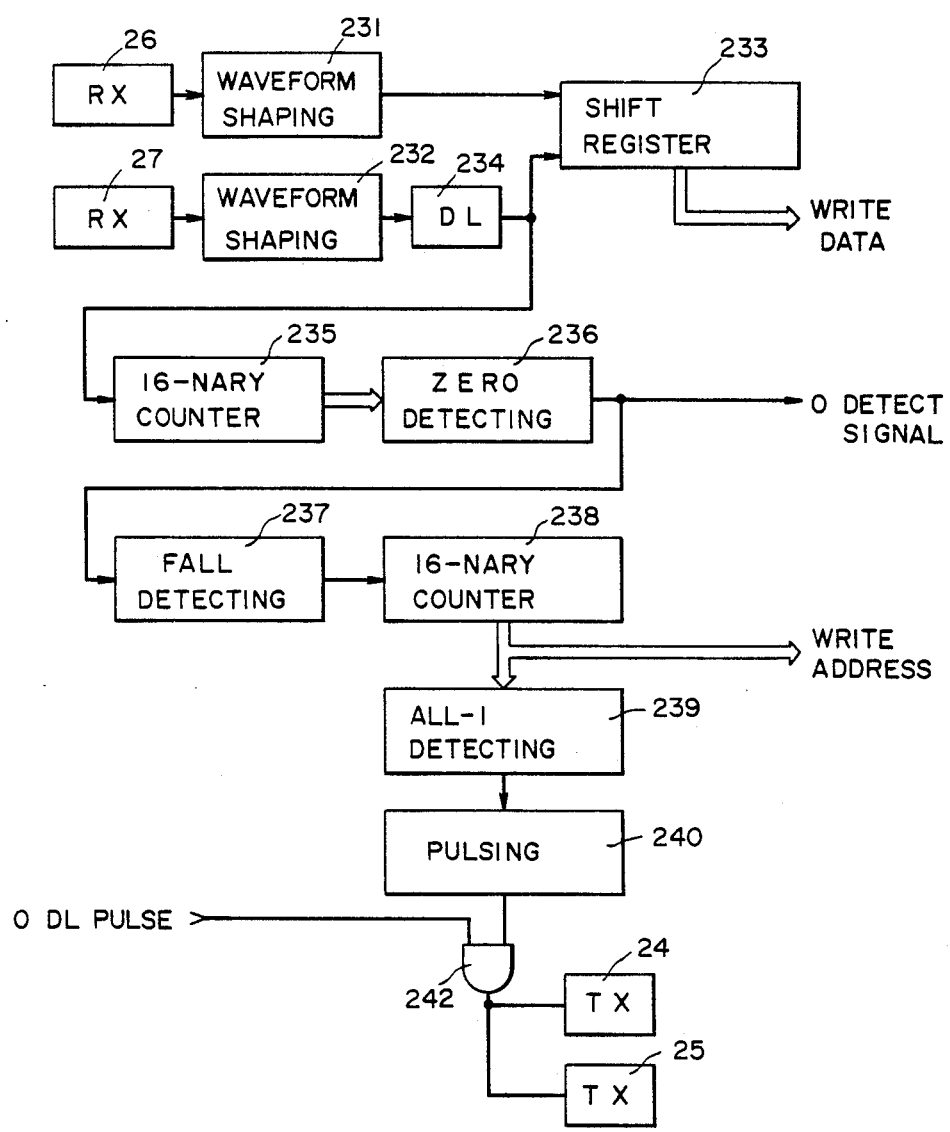
FIG. 14 is a block diagram of an input/output circuit shown in FIG. 10.

FIG. 13 is a block diagram showing in more detail the memory control circuit 11 shown in FIG. 10, and FIG. 14 is a block diagram showing in more detail the input/output control circuit 23 shown in FIG. 10. Now referring to FIGS. 13 and 14, the structure of the memory control circuit 11 and the input/output control circuit 23 will be described. The memory control circuit 11 shown in FIG. 13 is substantially the same as the memory control circuit 11 shown in FIG. 6, except that the delay circuits 126 and 127 and the pulsing circuits 128 are provided in place of the oscillator 111, the counter 112 and the decoder 113 shown in FIG. 6. The delay circuits 126 and 127 and the pulsing circuit 128 will be described subsequently in more detail.

On the other hand, as shown in FIG. 14, the input/output control circuit 23 comprises waveform shaping circuits 231 and 232, a shift register 233, a delay circuit 234, a 16-nary counter 235, a zero detecting circuit 236, a rise detecting circuit 237, a 16-nary counter 238, an "all one" detecting circuit 239 and a pulsing circuit 240. The waveform shaping circuit 231 is supplied with an on/off signal based on the reflected light pulse of the wavelength $\lambda1$ obtained from the light receiver 26. The waveform shaping circuit 232 is supplied with a timing signal based on the reflected light pulse of the wavelength $\lambda2$ obtained from the light receiver 27. The waveform shaping circuit 231 shapes the waveform of the on/off signal, which is then supplied to the shift register 233. The shift register 233 is structured to be of say 16 bits. The waveform shaping circuit 232 serves to shape the waveforms of the timing pulse, which is then supplied through the delay circuit 234 to the shift register 233. The delay circuit 234 is provided in order to delay the timing pulse so that the shift register 233 is securely loaded with the on/off signal obtained from the waveform shaping circuit 231 at the timing of the rise of the timing pulse. The output signal from the shift register 233 is fed to the memory 13 shown in FIG. 13 as the write data.

The timing pulse obtained from the above described delay circuit 234 is fed to the 16-nary counter 235. The 16-nary counter 235 is structured to be of say 16 bits so that sixteen timing pulses may be repetitively counted. This number of bits are equal to the number of shift register. The count output signal from the 16-nary counter 235 is fed to the zero detecting circuit 236. The zero detecting circuit 236 is provided to detect whether the count value of the 16-nary counter 235 has reached zero. More specifically, the zero detecting circuit 236 detects that the 16-nary counter 235 has counted all the timing pulses corresponding to the sixteen on/off optical switches 701 to 716. The zero detected signal obtained from the zero detecting circuit 236 is fed to the memory control circuit 11 shown in FIG. 13 and is also fed to the fall detecting circuit 237. The fall detecting circuit 237 serves to detect the time when the zero detected signal drops from the high level to the low level, to provide the output to the 16-nary counter 238. The 16-nary counter 238 is also structured to be of say 16 bits, so that the shift register 233 may step up the addresses each time the on/off signal of the on/off optical switches 701 to 716 is loaded. To that end, the count output signal of the 16-nary counter 238 is fed to the memory control circuit 11 as the address signal. The count output signal of the 16-nary counter 238 is also fed to the "all one" detecting circuit 239. The "all one" detected signal obtained from the "all one" detecting circuit 239 is fed to the pulsing circuit 240, so that the same is converted to a pulse signal of a relatively narrow pulse width. The pulsing signal is fed to the light transmitters 24 and 25. In the foregoing, the counter 238 was described as being of 16 bits so as to be adaptable to the 256 on/off signal sources; however, in the case where as many on/off signal sources as up to 512 are to be installed, a counter of 32 bits is utilized.

Referring again to FIG. 13, the memory control circuit 11 will be described. The zero detected signal obtained from the zero detecting circuit 236 is through the inverter and is the delay circuit 126. As described previously in conjunction with FIG. 6, the AND gate 116 sets the flip-flop 118 if and when the ready signal is obtained from the central processing unit 1 in the absence of the zero detected signal and the address coincidence detected signal is obtained from the address coincidence detecting circuit 125. On the other hand, the delay circuit 126 delays the zero detected signal and the delayed signal is supplied to the address selecting circuit 12 as an address selecting signal. The delay circuit 121 compensates for a time period after the data of the memory 13 is obtained at the data bus until the data is loaded in the central processing unit 1 if and when the flip-flop 118 is set immediately before the zero detected signal is obtained. Since the loading of the data in the central processing unit 1 has been completed after the lapse of the predetermined delay time of the zero detected signal, the address input of the memory 13 is turned to the input/output circuit 11. The delay circuit 127 is provided for the purpose of making adjustment such that the zero detected signal may coincide with the timing of the address signal being applied to the memory 13. After the predetermined delay time of the zero detected signal by the delay circuit 127, the write enable signal for storing the data of the shift register 233 in the memory 13 is obtained through the pulsing circuit 128. It is pointed out that the interval of the reflected light pulses as delayed between the on/off optical switches 701 to 716 should be larger than the respective delay time periods of the delay circuits 126 and 127.

Now referring to FIGS. 10 to 14, an operation of the other embodiment of the present invention will be described. It is assumed that in an initial condition the count value of the 16-nary counter 238 has reached "all one". The "all one" detecting circuit 239 included in the input/output control circuit 23 determines that the count value of the 16-nary counter 238 has reached "all one", thereby to provide the "all one" detected signal to the pulsing circuit 240. The pulsing circuit 240 is responsive to the "all one" detected signal to provide a pulse signal of a relatively small pulse width to one input terminal of the AND gate 242. The other input of the AND gate 242 is connected to receive the delayed zero detected signal. The output signal from the AND gate 242 is applied to the light transmitters 24 and 25. The light transmitter 24 transmits a light pulse of wavelength λ1 and the light transmitter 25 transmits a light pulse of wavelength λ2. These light pulses are composed by the light composer 28, as shown in FIG. 10, so that the composed light pulse is transmitted through the light distributor 29 and the optical fiber path 19 to the light branch 401. The light branch 401 branches the light pulse so that the branched light pulse may be fed through the optical fiber lead 901 to the on/off optical switch 701.

Only the light pulse of the wavelength λ2 passes through the filter 70f and is reflected from the mirror 70e at the on/off optical switch 701. On the other hand, the light pulse of the wavelength λ1 is not reflected when the signal of the on/off optical switch 701 has been in the off state inasmuch as the filter 70d and the mirror 70f have been brought away from the end surface of the optical fiber lead 901 or is reflected when the signal of the on/off optical switch 701 has been in the on state inasmuch as the filter 70d and the mirror 70c are brought to be in contact with the end surface of the optical fiber lead 901. More specifically, in the case where the signal of the on/off optical switch 701 is in the off state, only the light pulse of the wavelength λ2 is reflected, whereas in the case where the signal of the on/off optical switch 701 is in the one state both the light pulses of the wavelengths λ1 and λ2 are reflected. The light pulse thus reflected at the on/off optical switch 701 is transmitted through the optical fiber lead 901, the light branch 401, the optical fiber path 19 and the light distributor 29 to the light separator 30. The separator 30 serves to separate the reflected light pulse of the wavelength λ1 and the reflected light pulse of the wavelength λ2 out of the reflected light pulses. The light separator 30 then provides the reflected light pulse of the wavelength λ1 to the light receiver 26 and the reflected light pulse of the wavelength λ2 to the light receiver 27.

On the other hand, the light pulse branched by the above described light branch 401 is in succession supplied to the succeeding on/off optical switches 702 to 716. As described previously, only the light pulse of the wavelength λ2 is reflected from the on/off optical switches which are placed in an off state and both the light pulses of the wavelengths λ1 and λ2 are reflected from the on/off optical switches which have been placed in an on state. It is appreciated that the reflected light pulse obtained from the on/off optical switch 702 has been delayed by a time period corresponding to the length of the optical fiber section 801 as compared with the reflected light pulse obtained from the on/off optical switch 701. Likewise, the reflected light pulses obtained from the on/off optical switches 703 to 716 are delayed in succession and return to the input/output circuit 22. If and when the respective lengths of the optical fiber sections 801 to 815 are different, then the intervals of the respective reflected light pulses are not constant and rather irregular. The light receiver 26 serves to convert the reflected light pulse of the wavelength λ1 to an electrical signal representative of the on signal, when is then fed to the shift register 233. On the other hand, the light receiver 27 serves to convert the reflected light pulse of the wavelength λ2 into an electrical signal serving as a timing pulse, which is fed to the shift register 233 with a delay of a predetermined time period provided by the delay circuit 234. Accordingly, the shift register 233 is loaded with the on signal based on the reflected light pulse of the wavelength λ1 as a function of the timing pulse. Since the shift register 233 is structured to be of sixteen bits, the write data representing whether the on/off optical switches 701 to 716 are in an on state or an off state is stored in the memory 13. On the other hand, the 16-nary counter 235 counts the timing pulse obtained from the delay circuit 234. When the 16-nary counter 235 counts the sixteen timing pulses, the count value reaches zero. The zero detecting circuit 236 detects that the count value in the 16-nary counter 235 has reached zero, thereby to provide the zero detected signal. The detected signal is fed to the address selecting circuit 12 with a delay provided by the delay circuit 126 shown in FIG. 13. Accordingly, the address selecting circuit 12 selects entry of the address input to receive the same from the input/output control circuit 23. When the reflected light pulse from the on/off optical switch 701 is received by the light receiver 26, the output of the 16-nary counter 235 turns from the logic zero to the logic one. Therefore, the output from the zero detecting circuit 236 turns from the high level to the low level. Then the fall detecting circuit 237 detects the fall of the zero detected signal. Since the count value of the 16-nary counter 238 has become "all one" at that time, the fall detecting circuit 237 causes a count operation in the 16-nary counter 238, whereby the count value turns to zero. Thus the storing regions of the first sixteen bits of the memory 13 are designated based on the count value in the 16-nary counter 238. The zero detected signal delayed by the above described delay circuit 126 is further delayed by the delay circuit 127 and is then pulsed by the pulsing circuit 128. The pulsed signal is fed to the memory 13 as the write enable signal, so that the memory 13 is placed in a write enable state. Accordingly, the memory 13 is loaded with the write data obtained from the shift register 233 in the storing regions of the first sixteen bits thus addressed.

Then the reflected light pulses obtained from the on/off optical switch group 700 of the next stage are fed to the light receivers 26 and 27 and in the same manner as described previously the on/off signals are loaded in the shift register as a function of the timing pulse. Since the 16-nary counter 235 counts the timing pulse, the count value changes from zero to one. Therefore, the zero detected signal of the high level from the zero detecting circuit 236 turned to the low level. When the 16-nary counter 235 counts the sixteen timing pulses, the rise detecting circuit 237 detects that the zero detected signal has turned from the high level to the low level, thereby to advance the 16-nary counter 238. As a result, the counter value of the 16-nary counter 238 becomes one. Therefore, the counter 238 designates the next address of the memory 13. The count value in the 16-nary counter 238 remains one until all of the sixteen reflected light pulses from the second on/off optical switches are completely received. Then the data of the shift register 233 is stored in the storing regions of the memory 13 addressed responsive to the output of the 16-nary counter 238. A series of operations is thus repeated and when all the on/off signals of the sixteen on/off optical switch groups 700 are stored in the memory 13 the count value of the 16-nary counter 238 becomes 15. The count value of the 16-nary counter 238 becomes 15, when the state of the first signal of the sixteen on/off optical switch groups 700 is stored in the shift register 233. The AND gate 240 provides the pulse signal in synchronism with the write enable signal of the memory 13, when the count value of the 16-nary counter 238 is 15, i.e. the state of the sixteenth on/off optical switch group is stored. The light transmitters 24 and 25 transmit again the light pulses to the on/off optical switches 701 to 716 of the respective on/off optical switch groups 700 in response to the above described pulse signal. The address selecting circuit 12 selects the address signal from the input/output circuit 23 only if and when the count value of the 16-nary counter 235 becomes zero and otherwise the same selects the address signal from the central processing unit 1. Accordingly, the central processing unit 1 can freely access the memory 13.

According to the above described embodiment, the light pulses of the different wavelengths λ1 and λ2 are composed and the composed light pulse is transmitted to the on/off optical switches 701 to 716 and the on/off optical switches 701 to 716 necessarily reflect the light pulse of the wavelength λ2 irrespective of an off or on state of the signals and also reflect the light pulse of the wavelength λ1 only if and when the signals of the on/off optical switches 701 to 716 are in the on state. Accordingly, it is possible to readily identify which of the on/off optical switches are in an on state or an off state by discriminating the presence or absence of the reflected light pulse of the wavelength λ1 at the timing pulse based on the reflected light pulse of the wavelength λ2. Since the embodiment is adapted such that the presence or absence of the pulse singal based on the reflected light pulse of the wavelength λ1 may be discriminated as a function of the timing pulse, it is not necessary to make constant or equal the pulse intervals of the timing pulse. Accordingly, it is not necessary to make the same the lengths of the optical fiber sections 801 to 815 for connecting the respective branches 401 to 416. Thus, the embodiment now in discussion is free from the requirement of the previously described embodiment in which the respective optical fiber sections 501 to 516 and the respective optical fiber leads 601 to 615 for connecting the respective on/off optical switches 201 to 216 need be of the same length, provided, however, that one requirement must be fulfilled in the embodiment now in discussion. For the present embodiment, the lengths of the optical fiber sections 801 to 815 and the optical fiber leads 901 to 916 for connecting the respective on/off optical switches 701 to 716 need be long enough to enable discrimination of the time differences between the reflected light pulses. Accordingly, the embodiment now in discussion eliminates any complicated work required for unification of the lengths of the optical fiber sections and the optical fiber leads in installation thereof and hence reduces the labor and time required for that purpose.

Figure 15:
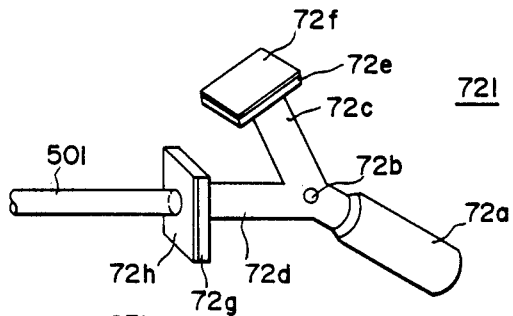
FIG. 15 is a perspective view of an on/off optical switch included in a further embodiment of the present invention.

FIG. 15 is a perspective view of the on/off optical switch 721 included in a further embodiment of the present invention. The FIG. 15 embodiment comprises an improvement on the embodiments described in conjunction with FIGS. 10 to 14. More specifically, the embodiments shown in FIGS. 10 to 14 were adapted such that the light pulse of the wavelength λ2 is reflected irrespective of whether the on/off optical switch 701 is in an on state or an off state whereas the light pulse of the wavelength λ1 is reflected only when the on/off optical switch 701 is in an on state. By contrast, the FIG. 15 embodiment is structured such that the light pulse of the wavelength λ1 is reflected only when the on/off optical switch 721 is in an on state whereas the light pulse of the wavelength λ2 is reflected only when the on/off optical switch 721 is in an off state. To that end, a handle 72a of the on/off optical swtich 721 is provided to be rotatable about a fulcrum 72b and the end of the handle 72a is bifurcated to constitute bifurcate fingers 72c and 72d. The tip end of one bifurcate finger 72c is provided with a filter 72f for transmission of only the light pulse of the wavelength λ1 and a mirror 72e for reflection therefrom of the said light pulse, while the tip end of the other bifurcate finger 72d is provided with a filter 72h for transmission of only the light pulse of the wavelength λ2 and a mirror 72g for reflection therefrom of the said light pulse. Meanwhile, the optical fiber lead 501 may be the same as employed in the FIG. 4 embodiment.

Figure 16:
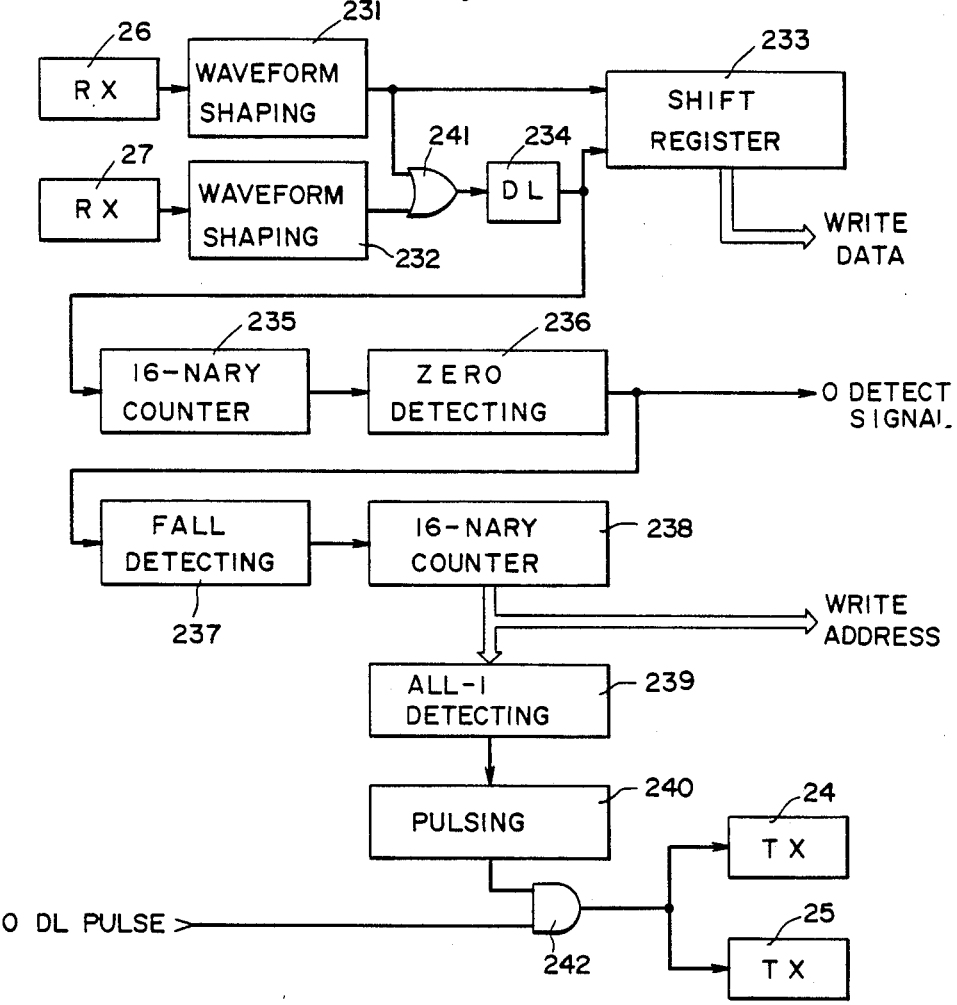
FIG. 16 is a block diagram of an input/output circuit included in a further embodiment of the present invention.

FIG. 16 is a block diagram of an input/output control circuit for use in the embodiment employing the on/off optical switch 721 shown in FIG. 15. The FIG. 16 embodiment is substantially the same as the previously described FIG. 14 embodiment, except for the following respects. More specifically, one light receiver 26 is adapted to receive a reflected light pulse of the wavelength λ1 from the on/off optical switch which has been in an on state. The other light receiver 27 is adapted to receive a reflected light pulse of the wavelength λ2 from the on/off optical switch 721 which has been in an on state. The on signal based on the reflected light pulse of the wavelength λ1 and the off signal based on the reflected light pulse of the wavelength λ2, as waveform shaped by the waveform shaping circuits 231 and 232, respectively, are fed through the OR gate 241 to the delay circuit 234.

The operation of the embodiment now in discussion is substantially the same as that of the embodiments described in conjunction with FIGS. 10 to 14, except for reflection of the light pulse by the on/off optical switch 721 and loading of the on/off signal in the shift register 233. Assuming that the signal of the on/off optical switch 721 has been in the on state, the filter 72f of the bifurcate finger 72c has been in contact with the end surface of the optical fiber lead 501. Therefore, only the light pulse of the wavelength λ1 is reflected, while the light pulse of the wavelength λ2 is not reflected. The light receiver 26 provides an on signal based on the reflected light pulse of the wavelength λ1, which is fed through the waveform shaping circuit 231 to the OR gate 241 and the shift register 233. Accordingly, the shift register 233 is loaded with the on signal directly fed from the waveform shaping circuit 231, with the on signal obtained through the OR gate 241 as a timing pulse. In the case where the signal of the on/off optical switch 721 has been in the off state, the filter 72h of the other bifurcate finger 72d has been in contact with the end surface of the optical fiber lead 501. Therefore, only the light pulse of the wavelength λ2 is reflected, while the light pulse of the wavelength λ1 is not reflected. The light pulse of the wavelength λ2 is received by the light receiver 27. The light receiver 27 provides an off signal based on the reflected light pulse of the wavelength λ2. The off signal is fed to the shift register 233 through the waveform shaping circuit 232, the OR gate 241 and the delay circuit 234 as a timing pulse. Since the light receiver has not received the reflected light pulse at that time, the output therefrom assumes the level representing an off signal. The off signal thus obtained is fed through the waveform shaping circuit 231 to the shift register 233. Accordingly, the shift register 233 is loaded with the off signal obtained from the light receiver 26, with the off signal based on the reflected light pulse of the wavelength λ2 received by the light receiver 27 as a timing pulse.

As described in the foregoing, the embodiment now in discussion is adapted such that the light pulse of the wavelength λ1 is reflected when the on/off optical switch is in an on state and the light pulse of the wavelength λ2 is reflected when the on/off optical switch is in an off state. Therefore, a timing pulse can be locally obtained using both reflected light pulses. By thus discriminating the output signal from the light receiver 26 as a function of the timing pulse thus obtained, it is possible to identify which of the on/off optical switches are in an on state and in an off state. Thus, the embodiment now in discussion simplifies the geometry of the optical fiber leads 501 which is generally difficult to manufacture, at the sacrifice of a complicated structure of the handle 72a.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A process signal collecting apparatus for collecting signals associated with a process control, comprising:
   light transmission path means,
   a plurality of light transmission branch means coupled to said light transmission path means,
   light transmitting means coupled to said light transmission path means for transmitting a light pulse to said light transmission path means and said plurality of light transmission branch means,
   a plurality of optical switch means coupled to said plurality of light transmission branch means for reflecting said light pulse from said light transmitting means when said optical switch means assume a first state and for differentiating the reflection state of said light pulse from said light transmitting means when said optical switch means assume a second state which is different from said first state,
   light receiving means coupled to said light transmission path means for detecting said differentiation of the reflection state of said light pulse at said optical switch means
   the total length of the light transmission from said light transmitting means through said light transmission path means and said light transmission branch means to each of said optical switch means and back therefrom through said light transmission branch means and said light transmission path means to said light receiving means being selected to be different from each other for each said optical switch means for uniquely identifying each said optical switch means by said total length of the light transmission,
   determining means responsive to the deteced output signal from said light receiving means for detecting said first state or second state being assumed by each of said plurality of optical switch means,
   said determining means comprising
   data providing means responsive to the outputs from said light receiving means for providing the data concerning said first state or said second state of each of said plurality of optical switch means in terms of respective time differences, each corresponding to said total length of the light transmission selected to be different for each said optical switch means, for uniquely identifying each said optical switch means, and
   timing pulse generating means for generating a timing pulse corresponding to each said time difference,
   storage means responsive to said determination by said determining means for storing the data concerning said determination of said first state or said second state being assumed by each of said plurality of optical switch means, and
   process control means responsive to said data concerning said determination of said first state or said second state being assumed by each of said plurality of optical switch means stored in said storage means,
   said light transmitting means comprising first light transmitting means for transmitting a light pulse of a first wavelength, and
   second light transmitting means for transmitting a light pulse of a second wavelentgh, said apparatus further comprising
   light composing means for coupling said first and second light transmitting means to said light transmission path means for transmitting said light pulse of said first wavelength from said first light transmitting means and said light pulse of said second wavelength from said second light transmitting means to said light transmission path means in a combined manner, and wherein
   each said optical switch means comprises
   first light reflecting means for reflecting at least said light pulse of said first wavelength in response to said first state of said optical switch means, and
   second light reflecting means for reflecting said light pulse of said second wavelength in response to said second state of said optical switch means, and wherein
   said light receiving means comprises
   first light receiving means for receiving said light pulse of said first wavelength reflected by said first light reflecting means, and
   second light receiving means for receiving said light pulse of said second wavelength reflected by said second light reflecting means.

2. A process signal collecting apparatus in accordance with claim 1, wherein
   said timing pulse generating means comprises first timing pulse generating means for generating said timing pulse in response to the output from said first light receiving means and the output from said second light receiving means, and said data providing means comprises first shift register means for loading the output from said first light receiving means for providing the data concerning said first state or said second state of said two-value signal source means as a function of the output from said first timing pulse generating means.

3. A process signal collecting apparatus in accordance with claim 1, wherein
said first light reflecting means comprises particular light reflecting means for reflecting said light pulse of said first and second wavelengths in response to said first state of said optical switch means,
said second light receiving means comprises particular light receiving means for receiving said light pulse of said second wavelength reflected by said first light reflecting means and said light pulse of said second wavelength reflected by said particular light reflecting means,
said timing pulse generating means comprises second timing pulse generating means responsive to the output from said particular light receiving means for generating a second timing pulse, and
said data providing means comprises second shift register means for storing the output from said first light receiving means for providing the data concerning said first state or said second state of said optical switch means as a function of the output from said second timing pulse generating means.

4. A process signal collecting means in accordance with claim 2 or 3, wherein
said first and second light receiving means comprise first and second photodetecting means, respectively, for detecting the presence or absence of said reflected light pulse, and
at least one of said first and second shift register means comprises output withdrawing means for withdrawing the output from said first light detecting means as a function of the outputs from said first and second timing pulse generating means.

5. A process signal collecting apparatus in accordance with claim 1, wherein
said first light reflecting means comprises
first filter means for allowing transmission of said light pulse of said first wavelength, and
first mirror means for reflecting therefrom said light pulse of said first wavelength transmitted through said first filter means, and
said second light reflecting means comprises
second filter means for allowing transmission of said light pulse of said second wavelength, and
second mirror means for reflecting therefrom said light pulse of said second wavelength transmitted through said second filter means.

6. A process signal collecting apparatus in accordance with claim 3, wherein
said particular light reflecting means comprises
filter means for allowing transmission of said light pulses of said first and second wavelengths, and
mirror means for reflecting therefrom said light pulses of said first and second wavelengths transmitted through said third filter means.

7. A process signal collecting apparatus in accordance with claim 1, wherein
said light transmission path means is divided into sections by said plurality of said light transmission branch means coupled to said light transmission path means, and
each said section of said light transmission path means between said two adjacent light transmission branch means is selected to have a different length.

8. A process signal collecting apparatus in accordance with claim 7, wherein each said light transmission branch means comprises
a branch unit coupled to said light transmission path means, and
a light transmission lead coupled between said branch unit and said optical switch means, each of said light transmission leads being selected to have a length different from others of said light transmission leads.

* * * * *